United States Patent
Brown

(10) Patent No.: US 8,690,175 B2
(45) Date of Patent: Apr. 8, 2014

(54) STABILIZER BAR

(71) Applicant: Schaeffler Technologies AG & Co. KG, Herzogenaurach (DE)

(72) Inventor: Mark Brown, Lakewood, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/897,677

(22) Filed: May 20, 2013

(65) Prior Publication Data

US 2013/0307241 A1    Nov. 21, 2013

Related U.S. Application Data

(60) Provisional application No. 61/649,551, filed on May 21, 2012.

(51) Int. Cl.
*B60G 21/055* (2006.01)

(52) U.S. Cl.
USPC .............. 280/124.107; 280/5.506; 280/5.509; 267/183; 267/188; 192/54.51; 192/54.4; 192/69.7

(58) Field of Classification Search
USPC ............. 280/124.106, 124.107, 5.506–5.509, 280/5.511, 5.513; 267/183, 187, 188; 192/54.1, 54.51, 69.8, 69.7, 84.92, 94
See application file for complete search history.

(56) References Cited

U.S. PATENT DOCUMENTS

| | | | |
|---|---|---|---|
| 3,690,693 A | 9/1972 | Myers | |
| 6,345,831 B1 | 2/2002 | DeMarcellus | |
| 6,481,732 B1 | 11/2002 | Hawkins et al. | |
| 6,513,819 B1 | 2/2003 | Oliver et al. | |
| 6,550,788 B2 | 4/2003 | Schmidt et al. | |
| 6,659,475 B2 | 12/2003 | Clements et al. | |
| 6,948,707 B2 | 9/2005 | Gradu | |
| 7,080,843 B2 | 7/2006 | Heo | |
| 7,134,672 B2 | 11/2006 | Beishine et al. | |
| 7,309,074 B2 * | 12/2007 | Taneda | 280/124.107 |
| 7,717,437 B2 | 5/2010 | Adams et al. | |
| 7,726,666 B2 * | 6/2010 | Grannemann et al. | 280/5.511 |
| 7,766,344 B2 * | 8/2010 | Buma | 280/5.511 |
| 7,837,202 B2 | 11/2010 | Taneda et al. | |
| 7,887,071 B2 * | 2/2011 | Grieshaber et al. | 280/124.106 |
| 7,909,339 B2 | 3/2011 | Pinkos et al. | |
| 8,070,169 B2 * | 12/2011 | Kim et al. | 280/5.511 |
| 2002/0121748 A1 | 9/2002 | Ignatius et al. | |
| 2004/0140630 A1 | 7/2004 | Beishline et al. | |
| 2004/0217560 A1 | 11/2004 | Heller et al. | |
| 2010/0090432 A1 | 4/2010 | Hauser et al. | |
| 2010/0148456 A1 | 6/2010 | Taneda et al. | |
| 2010/0207343 A1 * | 8/2010 | Sano | 280/124.106 |
| 2011/0037239 A1 * | 2/2011 | Mori et al. | 280/124.106 |
| 2011/0074123 A1 * | 3/2011 | Fought et al. | 280/5.508 |
| 2012/0313338 A1 * | 12/2012 | Kondo | 280/124.106 |

\* cited by examiner

*Primary Examiner* — Nicole Verley
*Assistant Examiner* — Darlene P Condra
(74) *Attorney, Agent, or Firm* — Antun M. Peakovic

(57) ABSTRACT

A disconnectible stabilizer bar assembly for a vehicle having first and second stabilizer bar halves, a housing fixed to an end portion of each stabilizer bar half, so as to align the two halves. The housing containing a stator with magnetic coil, a rotor with exterior magnets and threaded onto a hollow screw, with the stator selectively rotating the rotor and the rotation translated into axial movement of the screw. The screw having meshing means on an interior surface and an end face, the interior meshing means meshed with an exterior meshing means on one of the stabilizer bar halves, and the end face meshing means selectively coupled and decoupled with aligned mashing means on the other of the stabilizer bar halves.

12 Claims, 5 Drawing Sheets

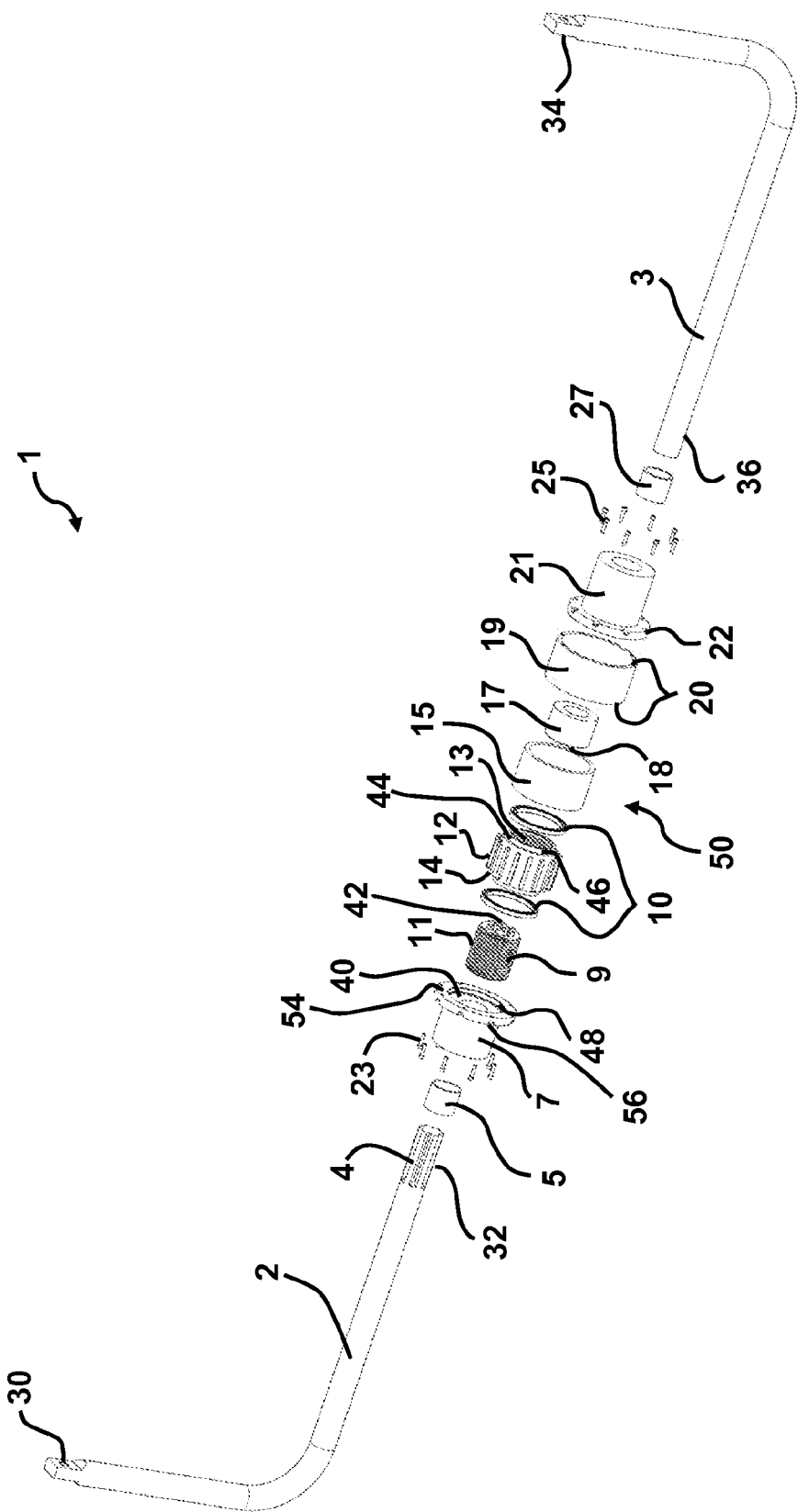

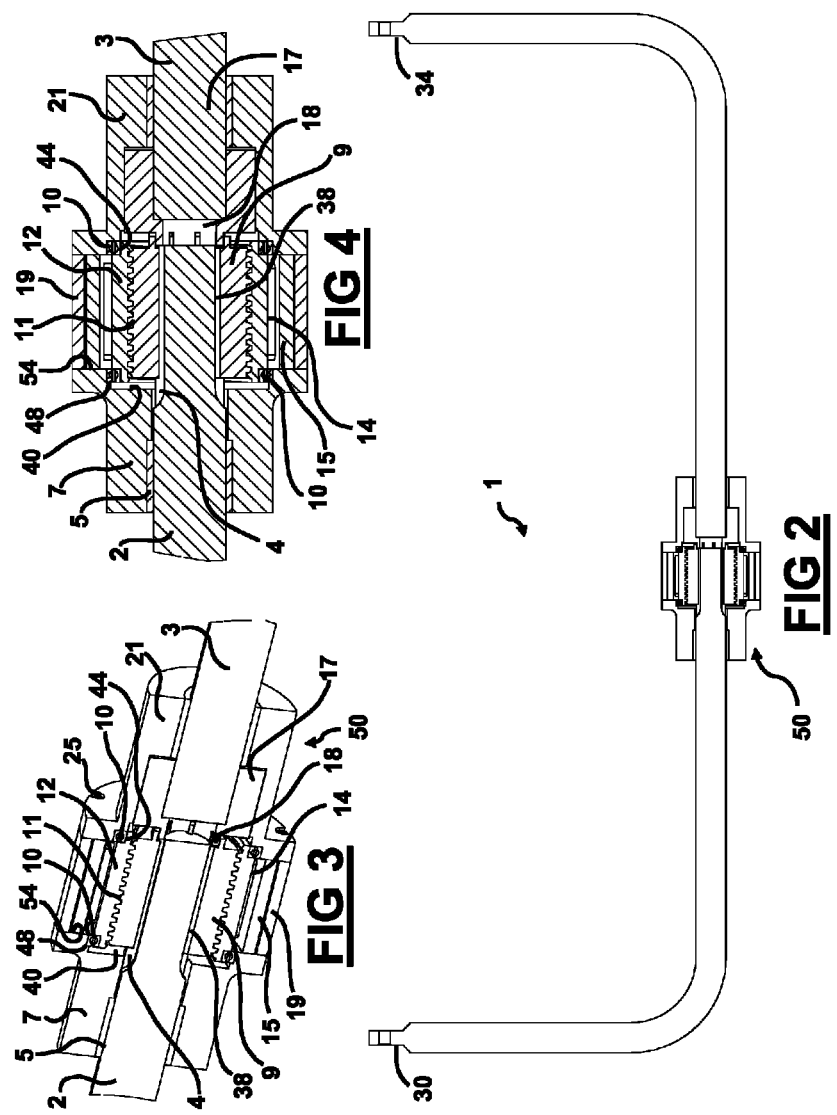

STABILIZER BAR

FIELD OF INVENTION

The present invention relates to a disconnectible anti-roll suspension system for a vehicle.

BACKGROUND

Vehicle suspension systems often include springs to support a portion of a vehicle, enable all of the vehicle wheels to maintain contact with the ground when travelling over uneven terrain, and isolate occupants of the vehicle from transmission of forces as a result of travel over the uneven terrain. When a vehicle turns, it is known that centrifugal forces acting on the wheel tend to cause the spring supported portion of the vehicle to roll, redistributing weight of the vehicle away from one or more of the vehicle's wheels. This redistribution may cause instability and may impede the ability of a driver to control the vehicle. Stabilizer bars or control devices interconnecting two wheels of the vehicle are used to resist the vehicle's tendency to roll in response to centrifugal forces.

Stabilizer bars reduce roll, however, a known drawback of using a stabilizer bar is that shock is transmitted from one wheel to another. For example, if a vehicle wheel were to strike a bump, that upward force would then be "copied" or imparted through the stabilizer bar to the opposite wheel, causing the opposite wheel to move in an upward direction. This "cross-talk" (i.e. jounce) between the vehicle wheels is undesirable, as it adversely affects vehicle ride.

In tuning the ride and handling of a vehicle, it is often desirable to soften or lower the spring rate of the suspension spring's to provide a softer, less harsh ride. Lowering the spring rate, however, permits the vehicle body to roll at a relatively higher rate. Accordingly, it would seem that the combination of springs with a very low spring rate and a relatively stiff stabilizer bar would optimize both the ride and handling of the vehicle.

Actively actuated, halved stabilizer bars or control systems are intended to provide the benefit of reduction or control of roll in the connected state, and reduction or elimination of "cross-talk" or force transmission between wheels in the disconnected state. A pair of independently mounted stabilizer bar halves that can be selectively de-coupled from one another are known, for example in U.S. Pat. No. 7,837,202 (hereinafter referred to as the '202 patent) and U.S. Pat. No. 7,909,339 (hereinafter referred to as the '339 patent).

SUMMARY OF THE INVENTION

Certain terminology is used in the following description for convenience and descriptive purposes only, and is not intended to be limiting to the scope of the claims. The terminology includes the words specifically noted, derivatives thereof and words of similar import.

According to an example embodiment of the present invention, a vehicle suspension system, particularly an anti-roll suspension, includes a pair of independently mounted stabilizer bar halves that can be selectively coupled or de-coupled from one another. A electric motor stator energizes magnets as a result of an external electrical signal, consequently rotating a rotor with internal threading. An associated hollow screw with external threading meshing with the internal threading of the rotor, and internal splines meshing with external splines of an associated stabilizer bar half, translates said rotation into axial motion of the hollow screw, engaging integral jaws or teeth on an end face of the screw with jaws or teeth integrally formed or fixed to and end face of a second stabilize bar half, thus coupling the two stabilizer bar halves. The torque resulting from an upward force on an associated wheel, directed through a stabilizer bar half can then be translated through the meshing jaws of the rotor and stabilizer bar half, and through the meshing splines of the rotor and other stabilizer bar half The above mentioned and other features and advantages of the embodiments described herein, and the manner of attaining them, will become apparent and be better understood by reference to the following description of at least one example embodiment in conjunction with the accompanying drawings. A brief description of those drawings now follows.

BRIEF DESCRIPTION OF DRAWINGS

FIG. 1 is a perspective exploded assembly view of a disconnectible stabilizer bar assembly according to one embodiment of the invention.

FIG. 2 is a cross sectional view of disconnectible stabilizer bar actuator assembly in the fully assembled state, according to one embodiment of the invention.

FIG. 3 is a cross-sectional perspective view of an actuator assembly of a disconnectible stabilizer bar, according to one embodiment of the invention.

FIG. 4 is a another cross-sectional view of the actuator assembly of FIG. 3.

DETAILED DESCRIPTION OF THE INVENTION

Figure 5:
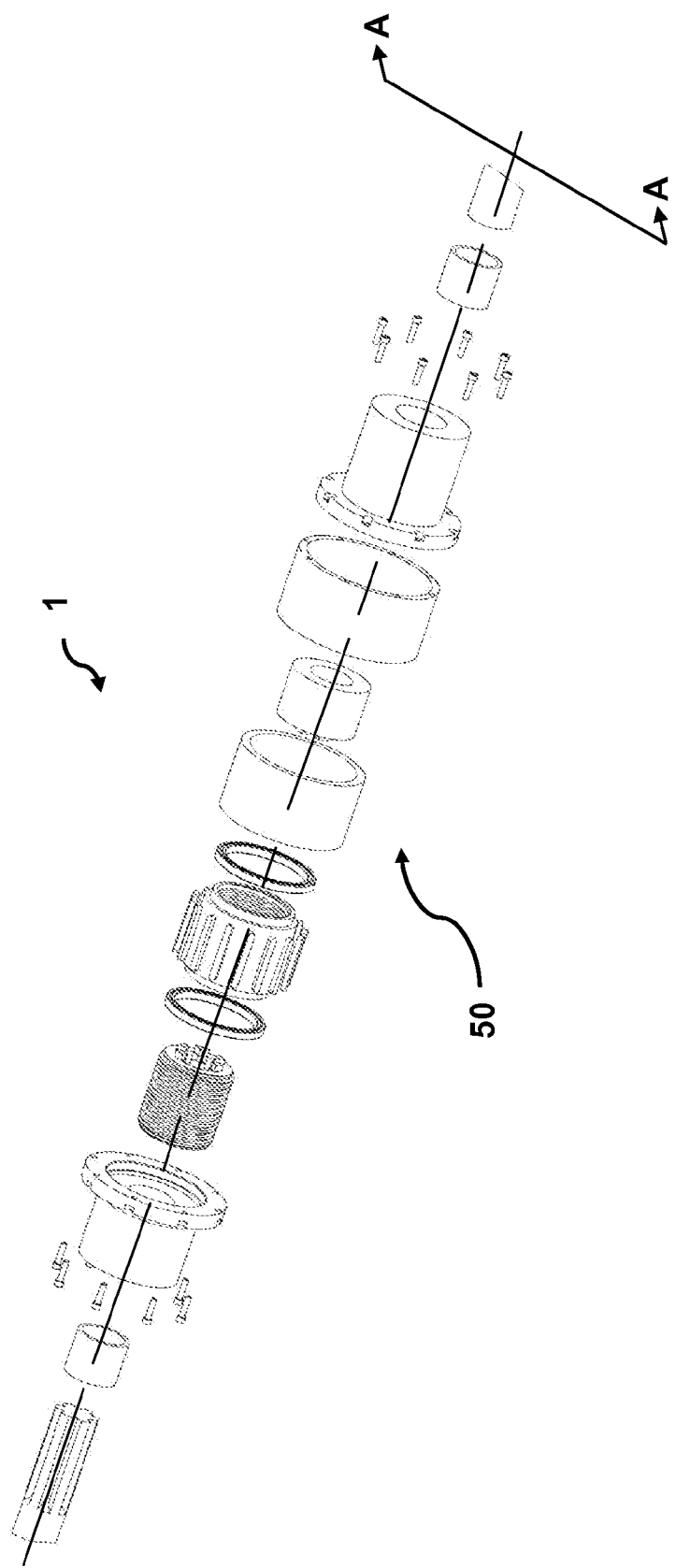
FIG. 5 is perspective exploded assembly view of the actuator assembly of the stabilizer bar assembly of FIG. 1.

Identically labeled elements appearing in different ones of the figures refer to the same elements but may not be referenced in the description for all figures. The exemplification set out herein illustrates at least one embodiment, in at least one form, and such exemplification is not to be construed as limiting the scope of the claims in any manner.

FIG. 1 shows a perspective exploded assembly view of disconnectible stabilizer bar assembly 1 according to one example embodiment of the invention. Stabilizer bar half 2 is an L-shaped curved bar which is formed according to the needs of a particular application, and includes a wheel linkage end 30 for connection to a wheel (see FIG. 7) of an associated vehicle (not shown), and a splined end 32, with integrally formed or machined splines 4. A second stabilizer bar half 3, is an L-shaped curved bar, including a wheel linkage end 34 and a coupling end 36, onto which fixed coupling slide 17 with integrally formed jaws 18, can be fixedly assembled. Alternatively, jaws 18 can be integrally formed or machined on end 36 of bar half 3. As will be understood by one of ordinary skill in the art, bar halves 2 and 3 can be of different forms, cross sections and configurations suitable for a particular vehicle application, and are thus not limited by the depiction shown in this example embodiment.

Actuator assembly 50 is assembled between splined end 32 of bar 2 and coupling end 36 of bar 3. Actuator assembly 50 comprises bushing 5 pressed or otherwise assembled onto end 32 of bar 2, with housing clamp half 7 assembled onto an outer diameter of bushing 5. Internal splines 38 (see FIGS. 2 and 4) of hollow screw 9 are slideably meshed with splines 4 of bar 2, and hollow screw 9 is abutted to an axial retention face 40 of housing clamp 7, on an end opposite jaws 42. Bearings 10 are assembled on bearing shelves 44, axially abutting an end face 46 on opposite axial ends of rotor 12, and internal thread 13 is threadingly engaged with external thread 11 of hollow screw 9, with bearing 10 abutting a lip 48 on housing clamp 7. Electric motor winding 15 is then slideably assembled on an outside diameter of rotor 12, abutting an end face of housing clamp 7, and housing 19 is then, in turn, assembled on an outside diameter of winding 15, until it abuts axial end face 54 of clamp 7 and fasteners 23 are inserted through holes 56 and securely fastened into holes 20 in housing 19. In turn, bushing 27 is assembled onto end 36 of bar 3, and housing clamp half 21 assembled onto an outer diameter of bushing 27. Fixed coupling slide 17 is assembled onto end 36 of bar 3, until an end opposite jaws 18 abuts an axial retention face 52 of clamp 21 (see FIG. 4). Finally, housing clamp 21 and bar 3, with associated assembled components are abutted to an end face of housing 19, and fasteners 25 are inserted through holes 22, and securely fastened into holes 20 of housing 19, thus firmly clamping the assembly into one unit.

FIG. 2 shows a cross sectional assembly view of disconnectible stabilizer bar 1 and actuator assembly 50, including wheel linkage ends 30 and 34, of stabilizer bars 2 and 3, respectively. A cross sectional view of actuator assembly 50 is described in greater detail in FIGS. 3 and 4.

FIGS. 3 and 4 show a cross sectional assembly view of disconnectible stabilizer bar 1 and actuator assembly 50, comprising stabilizer bar half 2 with external splines 4, stabilizer bar half 3, bushing 5, hollow screw 9 with internal splines 38 and external thread 11, housing clamp half 7 (including axial retention face 40, axial end face 54 and bearing lip 48), bearings 10, rotor 12 with internal thread 13, magnets 14 and bearing shelves 44, stator winding 15, housing 19, housing clamp 21, fasteners 25, and fixed coupling slide 17 with jaws 18.

Figure 6:
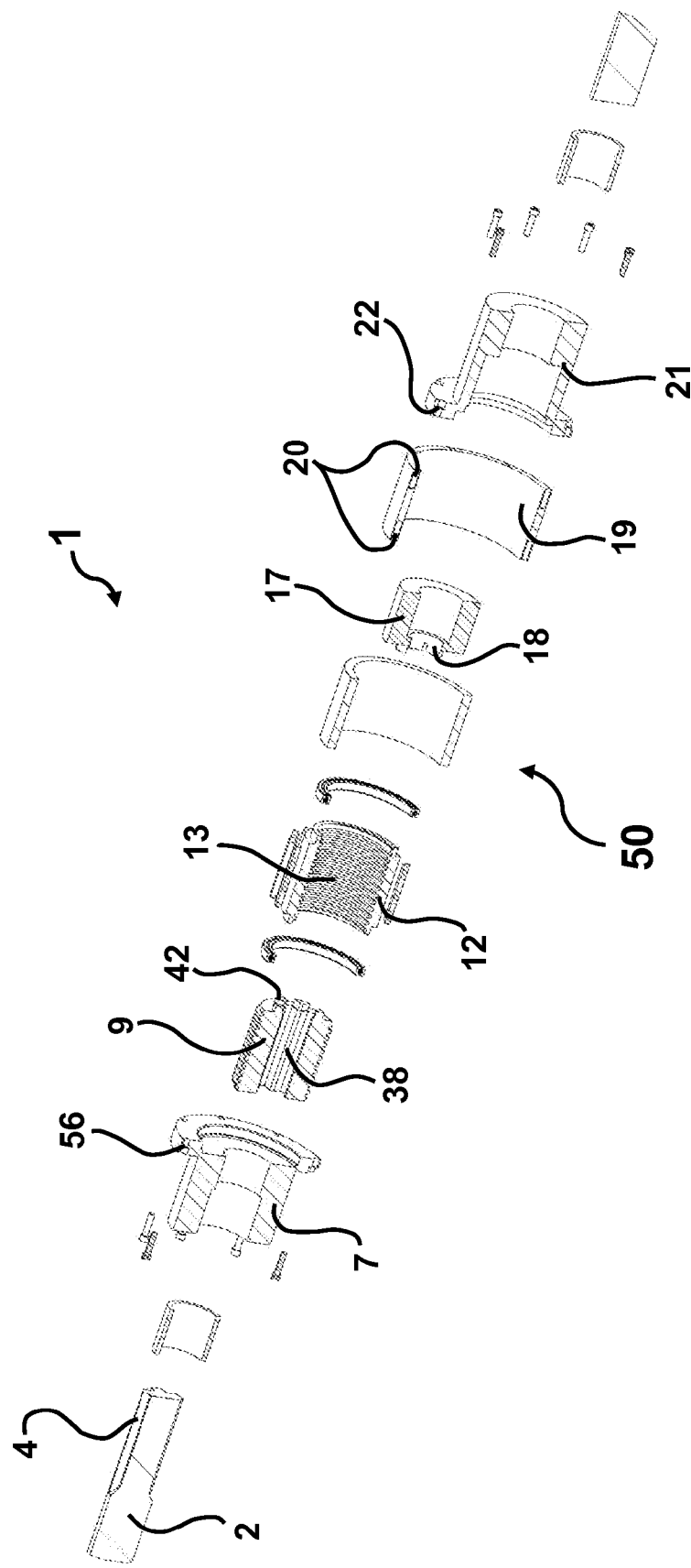
FIG. 6 is a cross sectional view of the actuator assembly of FIG. 3, taken along line A-A.

FIG. 5 shows a perspective exploded assembly view of actuator assembly 50 of stabilizer bar 1 of FIG. 1. FIG. 6 shows a cross sectional perspective exploded assembly view of FIG. 5, taken along line A-A. All the features are as previously described in FIGS. 1-5, with a more detailed view of internal splines 38 and jaws 42 of hollow screw 9, internal threads 13 of rotor 12, fastener holes 56 of housing clamp 7, fastener holes 20 of housing 19, fastener holes 22 of housing clamp 21, jaws 18 of fixed coupling slide 17, and external splines 4 of stabilizer bar half 2.

Figure 7:
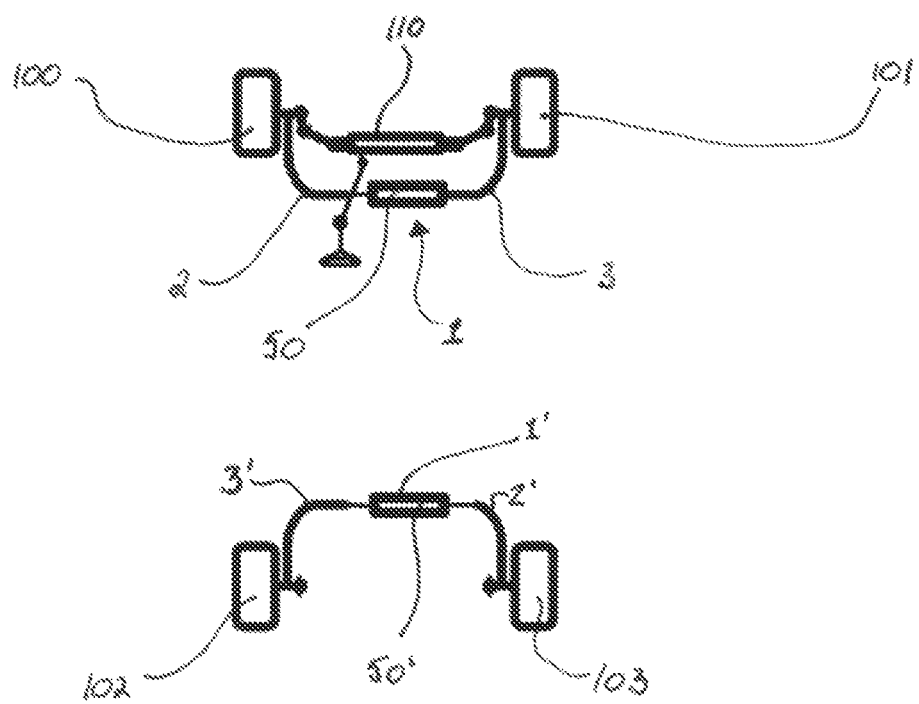
FIG. 7 is a top view of front and rear wheels of a drivetrain of a vehicle incorporating the disconnectible stabilizer bar assembly, according to one example embodiment of the inevntion.

FIG. 7 is a top view of a drivetrain of a vehicle. Front wheels 100, 101 are connected to stabilizer bar halves 2 and 3, respectively, is provided with a wheel speed sensor, in turn connected to an engine control unit (ECU), not shown, to measure and monitor wheel speed. Also shown is a steering control unit 110, linked to wheels 100, 101 at each end, respectively, allowing a driver of the vehicle to control wheel and vehicle direction. In addition, the ECU can be connected to a steering angle sensor (not shown), to measure and monitor steering angle of a steering wheel, a sensor to measure acceleration of the vehicle (not shown), a lateral acceleration sensor for measuring and monitoring lateral acceleration, among other sensors to measure vehicle speed, movement and driving characteristics. The ECU also generally includes control units, including a steering control unit 110, brake control unit (not shown) and stabilizer control unit (not shown), among other control units, in order to adjust vehicle driving parameters based on the measurements of the previously described sensors and control parameters.

Similarly, a second disconnectible stabilizer bar 1' is connected to each of rear wheels 102, 103 and functions the same as stabilizer bar 1, described above. Preferably, stabilizer bars 1 and 1' will connect and disconnect simultaneously.

When indicated by programming characteristics input into the ECU and based on the measurements obtained from the various sensors, the ECU provides an input signal to actuator assembly(ies) 50, 50' of stabilizer bar assembly(ies) 1, 1' to selectively connect or disconnect stabilizer bar halves 2, 2' and 3, 3', respectively.

To disconnect stabilizer bar halves 2 and 3, stator windings 15 are energized in order to activate magnets 14 such that rotor 12, fixedly associated with magnets 14, rotates, supported by bearings 10, in a direction such that meshed threads 13 of rotor 12 and 11 of hollow screw 9 will translate the rotational movement into axial movement of hollow screw 9 along splines 4 of stabilizer bar half 2, toward stabilizer bar half 2, until stopped by axial retention face 40 of housing clamp 7. In this manner jaws 42 of hollow screw 9 will disengage from jaws 18 of fixed coupling slide 17, disconnecting stabilizer bar half 2 from stabilizer bar half 3, allowing for independent movement of each stabilizer bar half To connect stabilizer bar halves 2 and 3, the reverse operation is performed from that described in the foregoing paragraph. Namely, a signal is sent to actuator assembly 50, energizing stator winding 15, and activating magnets 14 such that rotor 12, fixedly associated with magnets 14, rotates in a direction such that meshed threads 13 and 11 translate said rotation into axial movement of hollow screw 9 toward stabilizer bar half 3, until jaws 42 of screw 9 and jaws 18 of slide 17 mesh. Forces transmitted through the meshed connection of jaws 42 and 18, are transmitted through internal splines 38 of screw 9, and external splines 4 of bar half 2, into staibilizer bar 2.

In the foregoing description, example embodiments are described. The specification and drawings are accordingly to be regarded in an illustrative rather than in a restrictive sense. It will, however, be evident that various modifications and changes may be made thereto, without departing from the broader spirit and scope of the present invention.

In addition, it should be understood that the figures illustrated in the attachments, which highlight the functionality and advantages of the example embodiments, are presented for example purposes only. The architecture or construction of example embodiments described herein is sufficiently flexible and configurable, such that it may be utilized (and navigated) in ways other than that shown in the accompanying figures.

Although example embodiments have been described herein, many additional modifications and variations would be apparent to those skilled in the art. It is therefore to be understood that this invention may be practiced otherwise than as specifically described. Thus, the present example embodiments should be considered in all respects as illustrative and not restrictive.

LIST OF REFERENCE SYMBOLS

1 Disconnectible Stabilizer Bar Assembly
2 Stabilizer Bar Half (with integral splines)
3 Stabilizer Bar Half
4 Stabilizer Bar Splines
5 Bushing
7 Housing Clamp Half
9 Hollow Screw
10 Bearing
11 External Thread 12 Electric Motor Rotor
13 Internal Thread
14 Magnets
15 Stator Winding
17 Fixed Coupling Slide
18 Jaws or Teeth
19 Housing
20 Fastener Holes
21 Housing Clamp Half
22 Fastener Recess
23 Fasteners
25 Fasteners
27 Bushing
30 Wheel Linkage End
32 Spline End
34 Wheel Linkage End
36 Coupling End
38 Screw Internal Splines
40 Axial Retention Face
42 Jaws
44 Bearing Shelf
46 End Face
48 Bearing Lip
50 Actuator Assembly
52 Axial Retention Face
54 Axial End Face
56 Holes
100,101 Wheels
110 Steering Control Unit

What I claim is:

1. A stabilizer bar assembly comprising:
a first stabilizer bar connected to one of two wheels, having a first end connectible to a wheel and a second end;
a second stabilizer bar connected to the other one of the two wheels, having a first end connectible to a wheel and a second end;
an elongated housing having a first end, a second end, and a hollow cylindrical interior connected to the second end of the first stabilizer bar and fixedly attached to the second end of the second stabilizer bar, aligning the second ends of the first and second stabilizer bars;
a hollow cylindrical screw having internal meshing means on an interior surface and slideably meshed to the second end of the first stabilizer bar within the housing;
the screw having additional end face interlocking means on an end face opposite the end assembled onto the first stabilizer bar and a threaded outer surface;
an interlocking means on an end face of the second stabilizer bar assembled in the housing, aligned with the screw end face interlocking means;
a hollow cylindrical rotor rotateably assembled in the hollow cylindrical interior of the housing, and threadingly engaged on an interior surface with the exterior threads of the screw;
the rotor having a series of magnetic strips circumferentially distributed on an outer radial surface of the rotor;
a stator winding coil fixedly assembled in the hollow cylindrical interior of the housing, surrounding an outer surface of the rotor, aligned with the magnetic strips, such that the stator generates a magnetic field that acts on the magnetic strips on the rotor, rotating the rotor; and
the screw end face interlocking means and the stabilizer bar end face interlocking means selectively coupled and decoupled due to axial movement of the screw resulting from rotation of the threadingly engaged rotor.

2. The assembly of claim 1, wherein the first and second stabilizer bars are L-shaped bars.

3. The assembly of claim 1, wherein the housing is constructed of a hollow cylinder fixedly clamped between two axial housing clamping devices.

4. The assembly of claim 3, wherein one of each of the clamping devices is fixedly assembled to one of the first and second stabilizer bars.

5. The assembly of claim 1, wherein the screw interior meshing means are splines.

6. The assembly of claim 1, wherein the screw end face interlocking means are a series of axially projecting teeth distributed around a periphery of the end face of the screw.

7. The assembly of claim 1, wherein the second stabilizer bar end face interlocking means is a separately manufactured sleeve, fixedly attached to the second end of the stabilizer bar.

8. The assembly of claim 7, wherein the separately manufactured sleeve includes axially projecting teeth distributed around a periphery of the end face of the sleeve.

9. An actuator assembly comprising:
an elongated housing having a hollow cylindrical interior
a hollow cylindrical screw having meshing means on an interior surface;
the screw having additional interlocking means on an axially inner end face, and a threaded outer surface;
a hollow cylindrical rotor rotateably assembled in the hollow cylindrical interior of the housing, and threadingly engaged on an interior surface with the exterior threads of the screw;
the rotor having a series of magnetic strips circumferentially distributed on an outer radial surface of the rotor; and
a stator winding coil fixedly assembled in the hollow cylindrical interior of the housing, surrounding an outer surface of the rotor, aligned with the magnetic strips, such that the stator generates a magnetic field that acts on the magnetic strips on the rotor, rotating the rotor.

10. The assembly of claim 9, wherein the housing is constructed of a hollow cylinder fixedly clamped between two axial housing clamping devices.

11. The assembly of claim 9, wherein the screw interior meshing means are splines.

12. The assembly of claim 9, wherein the screw end face interlocking means are a series of axially projecting teeth distributed around a periphery of the end face of the screw.

* * * * *